Patented June 11, 1929.

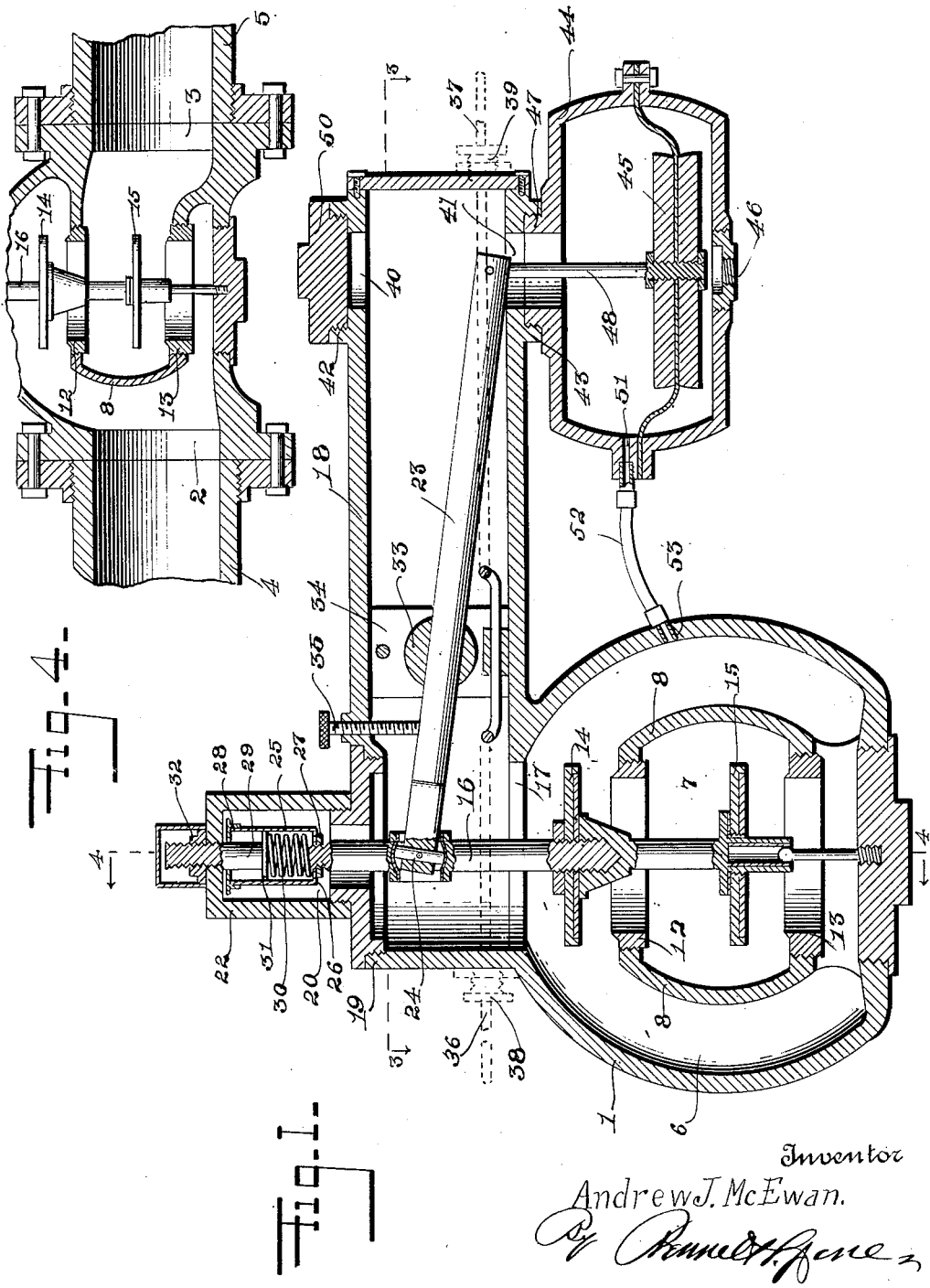

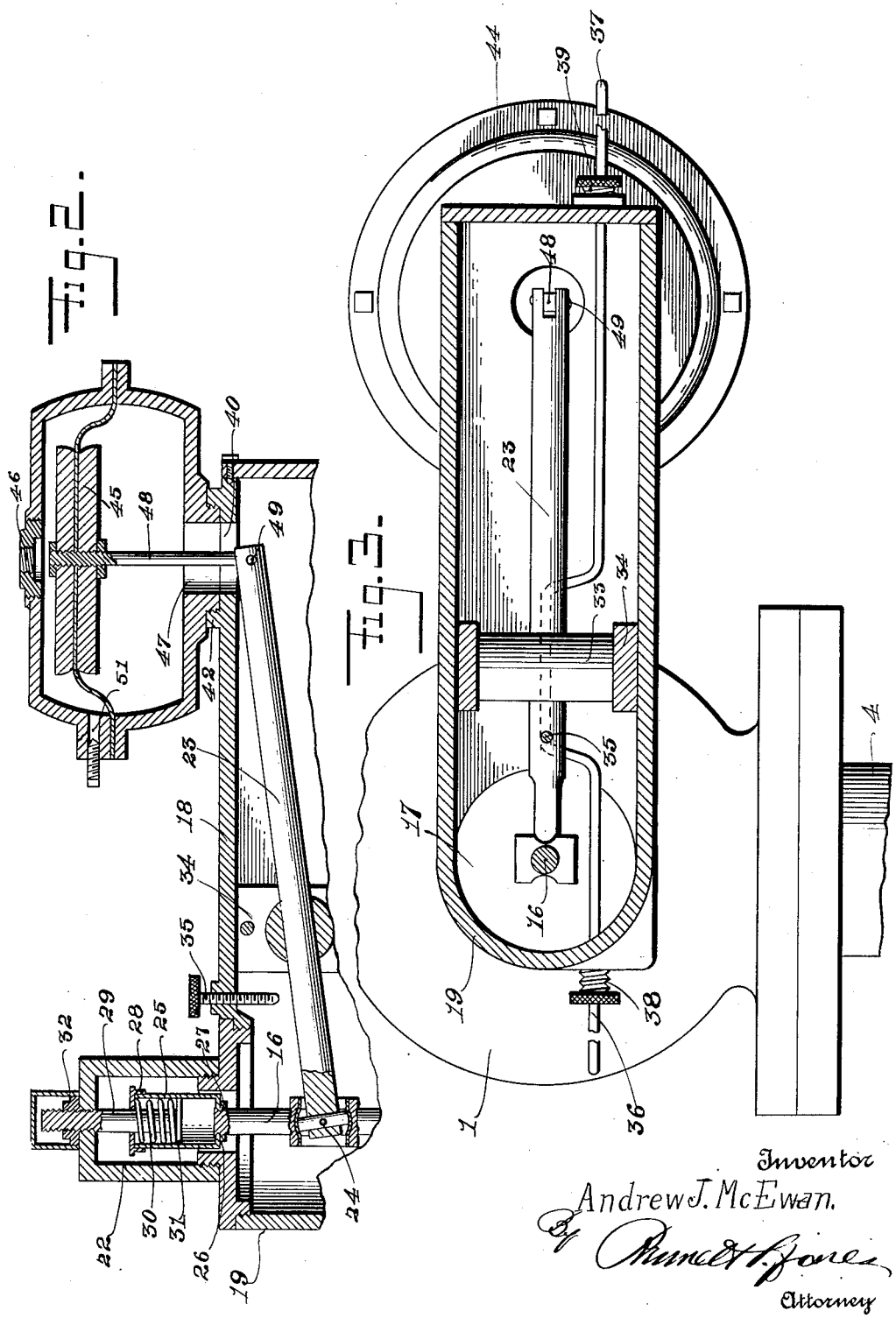

1,716,705

UNITED STATES PATENT OFFICE.

ANDREW J. McEWAN, OF TULSA, OKLAHOMA.

PRESSURE-REGULATING VALVE.

Application filed September 30, 1926. Serial No. 138,780.

This invention relates to pressure regulating valves for regulating the flow of fluids and liquids through service systems, and particularly to pressure regulating valves of that type in which the valve is controlled by a lever mechanism governed in action by a diaphragm or piston influenced by the pressure on one side of the valve.

One object of the invention is to provide a pressure regulating valve of this type in which the construction is such as to adapt the diaphragm or piston to be reversed so as to operate in one position to control the opening of the valve for pressure maintenance and relief service, and so as to operate in an opposite or reversed position to control and closing of the valve for pressure reducing service.

A further object of the invention is to provide a valve of this type which permits of the reversal of the diaphragm without variation of the valve structure, so that the operation of the valve may be varied for the different service purposes stated in a ready and convenient manner.

A still further object of the invention is to provide a valve in which the lever mechanism may be adjusted to vary the valve action as required in either of the working positions of the diaphragm.

A still further object of the invention is to provide a valve in which the working parts, including the lever mechanism, are enclosed and protected from possible derangement and injury, as well as from the elements.

The invention consists of the features of construction, combination and arrangement of parts, hereinafter fully described and claimed, reference being had to the accompanying drawings, in which:—

Figure 1 is a vertical longitudinal section through a pressure regulating valve embodying my invention, showing the diaphragm as arranged for use to control the opening of the valve, adapting the valve for pressure maintenance and relief service.

Figure 2 is a fragmentary view similar to Figure 1, showing the diaphragm reversed to adapt the valve for pressure reducing service.

Figure 3 is a sectional plan view on line 3—3 of Figure 1.

Figure 4 is a vertical transverse section through the valve casing, taken on line 4—4 of Figure 1.

In carrying my invention into practice, I provide a pressure regulating valve comprising a valve casing 1 having at diametrically opposite sides thereof ports 2 and 3, adapted to interchangeably serve as inlet and outlet ports, and with which ports, in service, connect the mains or pipes 4 and 5 of the service system. The valve casing is provided with an outer chamber 6 and an inner chamber 7, the latter being formed by a partition 8. This partition is so formed as to close the inner chamber 7 against direct communication with the port 2 at its side facing said port, while it is provided with a side opening 9 affording direct communication between the chamber 7 and the port 3, and in its top and bottom the partition 8 is provided with openings 10 and 11 having valve seats 12 and 13 fitted therein. A double valve is provided for controlling communication between the ports 2 and 3 and the chambers 6 and 7, said valve comprising balanced valve members 14 and 15 adapted for engagement with the valve seats 12 and 13. These valve members are carried by a vertically movable stem 16 whereby they are connected for movement in unison.

The valve chamber 6 is in open communication at its upper end through a port 17 with the bottom portion of the adjacent end of a control lever casing 18, which end of the casing 18 is provided with a threaded opening 19 in its top in which is fitted a cap or closure plate 20. This cap or closure plate 20 has a flanged opening 21, with the flange of which connects a bonnet or pressure spring chamber 22. Arranged within the casing 18 and extending longitudinally thereof is a control lever 23, pivotally connected at one end, as at 24, with the valve stem 16. The stem 16 projects above the lever through the opening 21 into the bonnet 22 and is threaded to receive a spring cage or casing 25 which has an end portion 26 provided with an opening of a size to receive and engage the threaded portion of the stem and adapted to be fastened thereto by a securing nut 27, the opposite end of the cage or casing being normally fully open and adapted to be closed by a threaded cap 28 having an opening of sufficient diameter for the passage of a relatively stationary but adjustable stem 29. When the parts are ararnged for service action as shown in Figure 1, the end 26 of the cage or casing 25 is downwardly disposed so as to form an abutment for the lower end of a controlling spring 30 which bears at its upper end against an abutment head or flange 31 on the abutment stem 29. The upper end of the abutment stem is threaded and passes upwardly and outwardly through a threaded opening in the top of the bonnet 22 and is adapted to be fixed in adjustable position by a nut 32. The cage or casing 25 is movable with the valve stem 16 and with relation to the abutment stem 29 and, in addition to serving as an abutment for one end of the spring 30, also serves as a guide for the spring and stem to adapt them to move in a straight vertical path. With the arrangement of the spring and its casing shown in Figure 1, the spring acts to resist upward or opening movement of the valves 14 and 15 and as a pressure element to assist in holding the valves closed and maintaining them in closed position. By adjusting the abutment 29 the working pressure of this spring may obviously be varied within certain degrees.

The lever 23 is fulcrumed intermediate of its ends in a shifting fulcrum comprising a roller bearing 33 through which the lever slidably extends, said bearing being journaled in a shifting carrier or fulcrum block 34, and at its inner end the upward movement of the valve stem engaging arm of the lever is limited by means of an adjustable stop screw 35. The shifting fulcrum is adapted to be shifted inwardly or outwardly in the casing 18 by means of a shifting rod preferably composed of two sections 36 and 37, threaded or otherwise connected at their inner ends with the block 34 and having their opposite ends projecting outwardly at opposite ends of the casing 18 through stuffing-boxes 38 and 39, the construction being such that the projecting end of either rod member 36 or 37 may be grasped and the rod operated to shift the fulcrum block 34 to vary the fulcrum point of the lever 23.

At its outer end, or end remote from the valve casing 1, the control lever casing 18 is provided with top and bottom openings 40 and 41 arranged diametrically opposite each other, said openings being bound externally by internally threaded flanges 42 and 43. A chamber 44 containing a controlling diaphragm or piston 45 is provided at one side with an air inlet and discharge opening 46, for a well known purpose, and at its opposite side with a threaded nipple 47 engageable with the flange 42 or the flange 43 to reversibly dispose the diaphragm or piston chamber in different working positions. A stem 48 is connected at one end with the diaphragm or piston 45 and is adapted to be extended through either opening 40 or 41 and detachably connected at its opposite end, by a pin or other fastening connection 49, with the outer end of the control lever 23. When the diaphragm chamber is connected with the flange 43, as shown in Figure 1, for coaction with the opening 41, the opening 40 is closed by a suitable plug or closure 50. When the diaphragm chamber is reversed and connected with the flange 42 for coaction with the opening 40, as shown in Figure 2, for the purpose hereinafter described, the plug 50 is engaged with the flange 43 to close the opening 41. A drain opening 51 is provided in the diaphragm chamber which opens into that portion of the chamber between the diaphragm and the nipple 47, and has connected therewith one end of a drain pipe 52, the opposite end of which is adapted to be fitted in an opening 53 formed in the valve casing 1 and communicating with the chamber 6, this drain connection being employed when the diaphragm chamber is connected with the bottom opening 41, such drain connection allowing any moisture which may be deposited from the gas or vapor in the system in the chamber and flowing therefrom into the diaphragm chamber to drain into the valve chamber 6, thus preventing any interference which would otherwise be caused by such deposits with the movement of the diaphragm. The valve partitions 8 are so formed that the base of the partition facing the port 3 forms a dam to prevent inflow of moisture through the port 3 into the chamber 7 or the chamber 6 when the valve member is unseated, such moisture being retained in the pipe 5, while at the side toward the port 2 the base of the valve casing is made of convex form or with a sloping surface to allow all moisture entering the chamber 6 to drain back through the port 2 into the pipe 4, the moisture being discharged from the pipes 4 and 5 in any of the ways customarily employed. When the diaphragm chamber 44 is shifted from the bottom position shown in Figure 1 to the top position shown in Figure 2, the drain pipe 52 is disconnected from the opening 53, and the latter and disconnected end of the pipe 52 closed by plugs or other suitable fittings, or if desired, the pipe 52 when disconnected from the valve casing 1 may also be detached from the opening 51 and the latter closed by a suitable plug or closure.

The operation is as follows:

The valve device, with the diaphragm arranged as in Figure 1, is adapted for pressure maintenance and relief actions in a pipe line, port 2 acting as the inlet and port 3 as the outlet. In setting the valve for action, the spring 30 and fulcrum 34 are so adjusted that the spring pressure plus the force of gravity due to the weight of the valves 14—15 and their connecting parts will hold said valves closed against their seats 12—13 to maintain a predetermined pressure in the inlet pipe 4, such valve closing pressures acting in opposition to valve opening pressure on the diaphragm 45. When the valves 14—15 are in closed position port 3 and chamber 7 are closed against communication with port 2 and chamber 6, the valves being subjected on their inner faces to the pressure in the pipe 5 and chamber 7 and on their outer faces to the pressure in the pipe 4 and chamber 6, and being normally balanced with relation to each other. As long as the pressure in the pipe 4 and chamber 6 remains at or less than the predetermined pressure desired, the valves 14—15 remain closed, but as soon as the pressure in the pipe 4 and chamber 6 rises above this predetermined pressure, the latter-named pressure acting on the diaphragm 45 will force the diaphragm downward in its chamber 44 and pull downward upon the outer end of lever 23, thereby rocking said lever and forcing the inner end thereof upward to raise valves 14—15 to open position against their gravity resistance and the resistance of spring 30. Communication will then be established through the ports 10 and 11 between the chambers 6 and 7 and the pipes 4 and 5, resulting in a relief of pressure from the pipe 4 into the pipe 5. A reduction of pressure within pipe 4 and chamber 6 causes a shifting of preponderance of power from the diaphragm arm to the valve arm of the lever 23, so that under the force of gravity and the action of the spring 30 valves 14—15 will be again closed. By proper adjustment of the spring abutment and tensioning device 29, and of the shifting fulcrum 34, the power ratios between the valve arm and diaphragm arm of lever 23 may be varied, so as to adapt the valves 14—15 to be opened at any predetermined pressure, for a relief action, and to maintain a given pressure in the pipe line 4. When the regulator is to be used as a pressure reducing valve, port 3 is employed as the inlet communicating with the high pressure pipe 5 and port 2 as the outlet communicating with the low pressure pipe 4, the spring 30 is reversed so as to lie between the closure 28 of the spring cage 25 and the abutment head 31, so as to exert its pressure in a valve opening direction instead of a valve closing direction, the diaphragm casing 44 is disconnected from flange 43 and coupled to flange 42, diaphragm stem 48, which has been uncoupled from the lever 23, is again coupled to the lever in the reversed position of the diaphragm, and the plug 50, which has been removed from flange 42 to uncover opening 40, is applied to flange 42 to seal the opening 43. The diaphragm in this reversed position is now adapted to exert an upward pull on the diaphragm end of the lever, so that the force of the diaphragm pressure will be exerted to hold the valves 14—15 closed. The valves 14—15 are now exposed to the high pressure in chamber 7 from pipe 5 in a balanced manner on the respective valves, and the valves are opened by the opening pressure of the spring and the weight at the outer end of the lever, until such pressure is exceeded by the diaphragm pressure and the weight at the inner end of the lever, whereupon the valve is forced closed for a pressure reducing action, opening again when the pressure within chamber 6 and pipe 4 is reduced to the predetermined degree.

In the use of the device for either of the purposes described the spring 30 and its coacting parts are preferably employed, in order to secure a smooth working action or to increase the resistance to the diaphragm pressure, when required. I may, however, omit the spring device under some conditions, as the complete operating mechanism may be designed with proper regard to weights and pressures to accomplish all of the operations hereinbefore outlined. It is to be understood, also, that while I have in the present instance disclosed the use of a diaphragm chamber and diaphragm, as a pressure chamber and pressure member, for transmitting motion in one direction to the controlling lever, any suitable equivalent elements, such as a cylinder and a piston, may be employed in their place.

It will be observed from the foregoing description that the invention provides a pressure control valve which is adapted, by a simple reversal of certain parts, and without change in the valve structure, or the use of additional parts, to serve as a pressure maintaining and relief valve or a pressure reducing valve, at will, the valve being convertible for such purposes in a ready and convenient manner and within a short period of time. Also it will be seen that the invention provides a pressure control valve which is simple of construction, reliable and efficient in action, adjustable to vary its action and adapt it to operate at different pressures, and in which provision is made for housing and protecting, from possible derangement or injury, and from the action of the elements, all of the parts of the valve mechanism, and for permitting of the drainage off from the valve device of any deposited moisture, thereby ensuring efficiency of action of the valve under all climatic and other working conditions.

Having thus fully described my invention, I claim:—

1. In a fluid pressure regulator, a valve, a fluid pressure actuated means reversible for applying either opening or closing movement to the valve, and a pressure spring shiftable for coaction with the fluid pressure actuated means in either working action of the latter.

2. In a fluid pressure regulator, a valve, a diaphragm reversible for applying either opening or closing movement to the valve, and a pressure spring shiftable for coaction with the diaphragm in either working action of the latter.

3. In a fluid pressure regulator, a valve, an intermediately fulcrumed lever coupled on one side of its fulcrum to the valve, a fluid pressure actuated device coupled to the lever on the opposite side of its fulcrum, said device being reversible for applying either valve opening or valve closing force to the lever, and a spring for applying force to the valve and lever on the valve side of the fulcrum of the latter, said spring being reversible to coact with the fluid pressure actuated device in either working action of the latter.

4. In a fluid pressure regulator, a valve, an intermediately fulcrumed lever having one of its arms coupled to the valve, a diaphragm coupled to the other arm of the lever and reversible to apply either valve opening or valve closing motion to the lever, and a spring acting on the valve arm of the lever to which the valve is coupled, said spring being reversible to coact with the diaphragm in either working action of the latter.

5. In a fluid pressure regulator, a valve, a mechanical pressure device, and a fluid pressure device, said devices operating conjointly for a valve controlling action and reversible in operation for either opening or closing the valve.

6. In a fluid pressure regulator, a casing having a pair of openings, a valve in said casing, a diaphragm chamber adapted to be secured to the casing for communication with either of said openings, and a diaphragm in said casing adapted to be operatively coupled to the valve in either position of the diaphragm chamber for transmitting opening or closing movement to the valve.

7. In a fluid pressure regulator, a casing having a valve chamber and a lever chamber, the latter provided with a pair of openings, a valve in the valve chamber, a lever in the lever chamber and coupled to the valve, a diaphragm chamber adapted to be secured to the lever chamber for communication with either opening therein, and a diaphragm in said chamber and coupled to the lever, said diaphragm operating according to the position of the diaphragm chamber to transmit opening or closing movement to the valve.

8. In a fluid pressure regulator, a casing having a valve chamber and a lever chamber, the latter provided with a pair of openings, a valve in the valve chamber, a lever in the lever chamber and coupled to the valve, a diaphragm chamber adapted to be secured to the lever chamber for communication with either opening therein, a diaphragm in said chamber and coupled to the lever, said diaphragm operating according to the position of the diaphragm chamber to transmit opening or closing movement to the valve, and a spring acting on the valve stem and lever in coaction with the diaphragm and reversible for exerting valve opening or valve closing pressure.

9. In a pressure regulating valve, a casing having a valve seat, a valve to engage said seat, a stem composed of upper and lower sections carrying the valve, said sections being detachably connected, wear plates on said sections, and a fluid pressure actuated lever having a bearing pin extending therethrough and having its ends pivotally engaging said wear plates.

10. In a pressure regulating valve, a valve casing, a valve controlling the flow of fluid therethrough, said valve including a stem, a lever operatively coupled to the valve stem, a spring acting on the valve stem to move the valve in one direction, means for regulating the action of said spring, fluid pressure means acting on the lever for moving the valve in the opposite direction, and a fulcrum for the lever adjustable in the casing slidably along the lever.

11. In a pressure regulating valve, a valve casing, a valve controlling the flow of fluid therethrough, said valve including a stem, a lever operatively coupled to the valve stem, a spring acting on the valve stem to move the valve in one direction, fluid pressure means acting on the lever for moving the valve in the opposite direction, and a fulcrum for the lever adjustable in the casing slidably along the lever.

In testimony whereof I affix my signature.

ANDREW J. McEWAN.